(12) United States Patent
Lin et al.

(10) Patent No.: US 7,576,720 B2
(45) Date of Patent: Aug. 18, 2009

(54) TRANSFLECTIVE LIQUID CRYSTAL DISPLAY

(75) Inventors: Yung-Lun Lin, Wujie Township, Yilan County (TW); Ching-Huan Lin, Hsin Ying (TW)

(73) Assignee: AU Optronics Corporation, Hsinchu (TW)

( * ) Notice: Subject to any disclaimer, the term of this patent is extended or adjusted under 35 U.S.C. 154(b) by 672 days.

(21) Appl. No.: 11/291,239

(22) Filed: Nov. 30, 2005

(65) Prior Publication Data

US 2007/0120797 A1 May 31, 2007

(51) Int. Cl.
*G09G 3/36* (2006.01)

(52) U.S. Cl. ............ 345/87; 345/89; 345/204; 349/114

(58) Field of Classification Search .......... 345/87, 345/89, 104; 349/114
See application file for complete search history.

(56) References Cited

U.S. PATENT DOCUMENTS

| | | | |
|---|---|---|---|
| 6,034,414 A | 3/2000 | Lin | 257/600 |
| 6,466,280 B1 | 10/2002 | Park et al. | 349/43 |
| 6,522,376 B1 | 2/2003 | Park et al. | 349/113 |
| 6,686,981 B2 | 2/2004 | Noritake et al. | 349/113 |
| 6,717,632 B2 | 4/2004 | Ha et al. | 349/43 |
| 6,806,929 B2 | 10/2004 | Chen et al. | 349/114 |
| 6,819,385 B2 | 11/2004 | Lu | 349/144 |
| 2001/0020991 A1 | 9/2001 | Kubo et al. | 349/113 |
| 2003/0227429 A1 | 12/2003 | Shimoshhikiryo | 345/90 |
| 2005/0012877 A1 | 1/2005 | Sasaki | 349/113 |
| 2005/0030271 A1* | 2/2005 | Liu | 345/89 |
| 2005/0073512 A1* | 4/2005 | Liu | 345/204 |

FOREIGN PATENT DOCUMENTS

JP 2006-208942 8/2006

* cited by examiner

*Primary Examiner*—Richard Hjerpe
*Assistant Examiner*—Leonid Shapiro
(74) *Attorney, Agent, or Firm*—Ware, Fressola, Van Der Sluys & Adolphson, LLP

(57) ABSTRACT

A single-gap transflective LCD panel having a voltage divider in each sub-pixel for reducing the voltage potential across part of the liquid crystal layer in the sub-pixel. In a normally-black LCD panel, the voltage divider is used to reduce the voltage potential across the liquid crystal layer in the reflection area. In a normally-white LCD panel, the voltage divider is used to reduce the voltage potential across the liquid crystal layer in the transmission area. The voltage divider comprises two poly-silicon resistor segments connected in series between a data line and a common line via one or more switching elements controlled by a gate line signal. With poly-silicon resistor segments being disposed in the reflection area below the reflective electrode, the optical quality of the upper electrode and the transmissive electrode is not affected by the voltage divider.

16 Claims, 18 Drawing Sheets

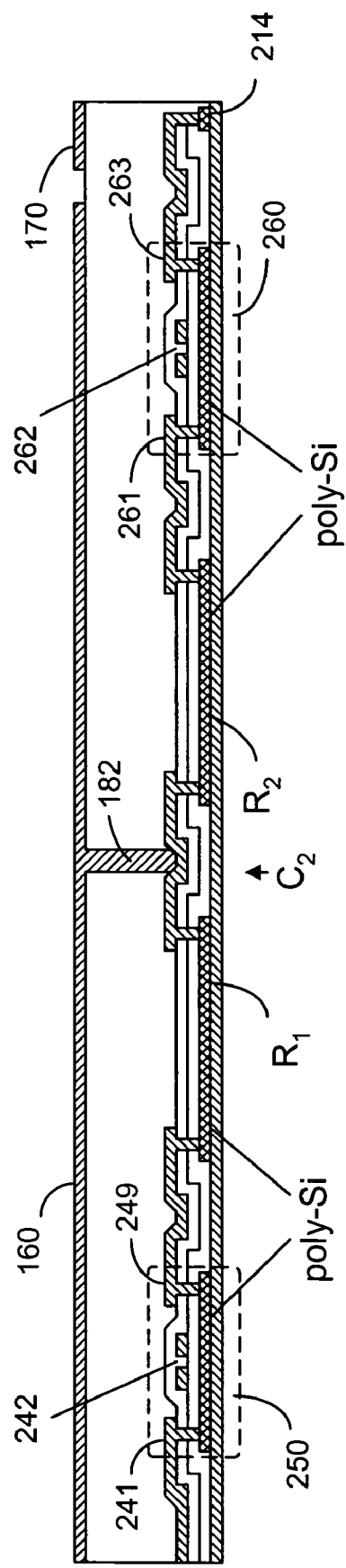
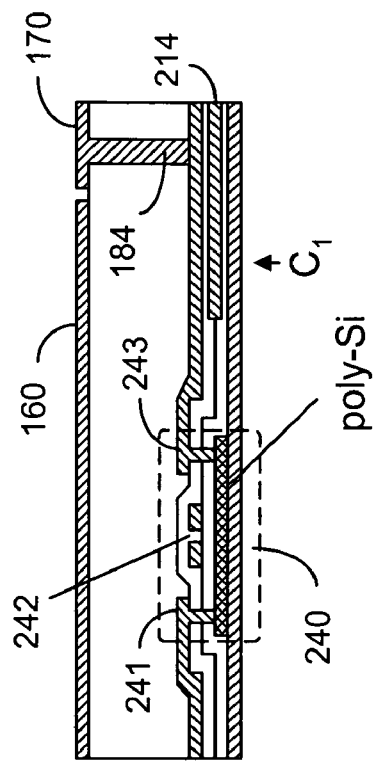
FIG. 9A
FIG. 9B

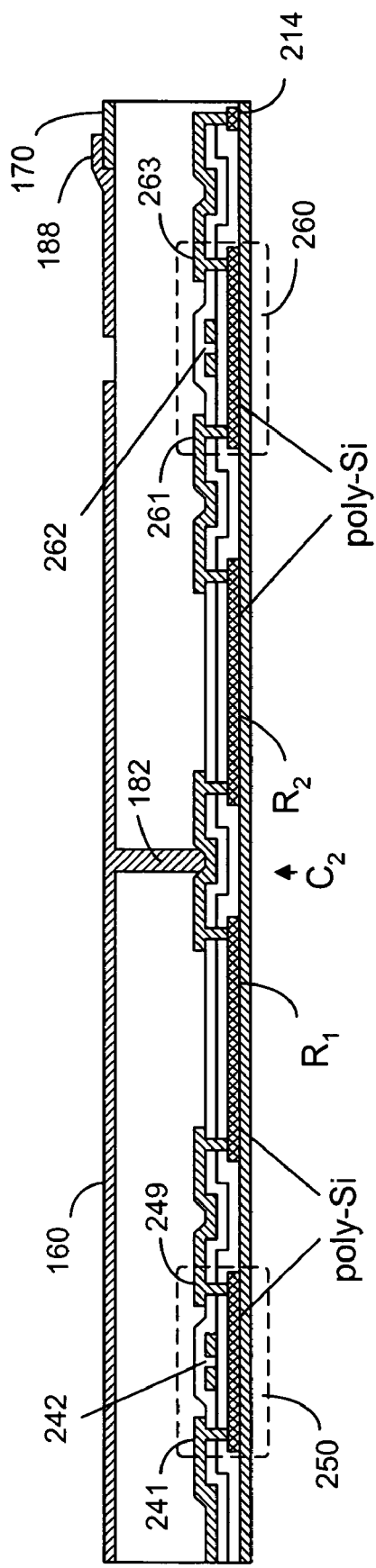
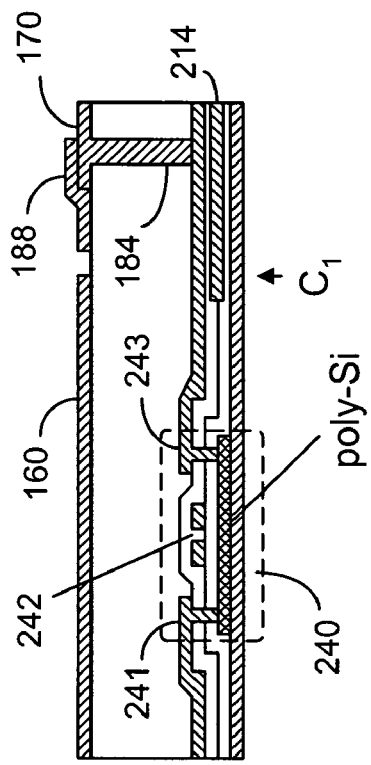
FIG. 13A
FIG. 13B

TRANSFLECTIVE LIQUID CRYSTAL DISPLAY

FIELD OF THE INVENTION

The present invention relates generally to a liquid crystal display panel and, more particularly, to a transflective-type liquid crystal display panel.

BACKGROUND OF THE INVENTION

Due to the characteristics of thin profile and low power consumption, liquid crystal displays (LCDs) are widely used in electronic products, such as portable personal computers, digital cameras, projectors, and the like. Generally, LCD panels are classified into transmissive, reflective, and transflective types. A transmissive LCD panel uses a back-light module as its light source. A reflective LCD panel uses ambient light as its light source. A transflective LCD panel makes use of both the back-light source and ambient light.

As known in the art, a color LCD panel 1 has a two-dimensional array of pixels 10, as shown in FIG. 1. Each of the pixels comprises a plurality of sub-pixels, usually in three primary colors of red (R), green (G) and blue (B). These RGB color components can be achieved by using respective color filters. FIG. 2 illustrates a plan view of the pixel structure in a conventional transflective LCD panel. As shown in FIG. 2, a pixel 10 is divided into three sub-pixels 12R, 12G and 12B, and each sub-pixel is divided into a transmission area (TA) and a reflection area (RA).

A typical sub-pixel 12 is shown in FIG. 3. As shown, the sub-pixel 12 has an upper layer structure, a lower layer structure and a liquid crystal layer 190 disposed between the upper layer structure and the lower layer structure. The upper layer comprises a polarizer 120, a half-wave plate 130, a quarter-wave plate 140, a color filter 144 and an upper electrode 150. The upper electrode 150 is made from a substantially transparent material such as ITO (Indium-tin oxide). The lower layer structure comprises an electrode layer having a transmissive electrode 170 and a reflective electrode 160. The transmissive electrode 170 is made from a transparent material such as ITO. The reflective electrode 160 also serves as a reflector and is made from one or more highly reflective metals such as Al, Ag, Cr, Mo, Ti, and AlNd. The lower layer structure further comprises a passivation layer (PL) 180, a device layer 200, a quarter-wave plate 142, a half-wave plate 132 and a polarizer 122. In addition, the transmissive electrode 170 is electrically connected to the device layer 200 through a via 184, and the reflective electrode 160 is electrically connected to the device layer 200 through a via 182.

In the transmission area as shown in FIG. 3, light (indicated by the arrow) from a back-light source (not shown) enters the pixel area through the lower layer structure, and goes through the liquid crystal layer 190 and the upper layer structure. In the reflection area, light encountering the reflection area goes through the upper layer structure and the liquid crystal layer before it is reflected by the reflective electrode 160.

In a typical LCD panel, the upper electrode 150 is connected to a common line. The lower electrodes are connected to a data line via a switching element, such as a thin film transistor, which can be switched on by a gate line signal. The equivalent circuit for a typical LCD sub-pixel is shown in FIG. 4. In FIG. 4, the common line voltage is denoted by Vcom, $V_T$ is the voltage level on the transmissive electrode 170 and $V_R$ is the voltage level on the reflective electrode 160 (see FIG. 3). $C_T$ represents the capacitance in the liquid crystal layer between the upper electrode 150 and the transmissive electrode 170, and $C_R$ represents the capacitance in the liquid crystal layer between the upper electrode 150 and the reflective electrode 160. The transmissive electrode 170 is connected to the data line Data m through a switching element TFT-1 and the reflective electrode 160 is connected to Data m through a switching element TFT-2. TFT-1 and TFT-2 are switched on by a gate line signal from the gate line Gate n−1. Typically, one or more charge storage capacitors are fabricated in the device layer 200 and the passivation layer 180 in a sub-pixel 12 so as to maintain the pixel voltage $V_T$ in the transmission area and the pixel voltage $V_R$ in the reflection area. As shown in FIG. 4, a charge storage capacitor $C_1$ is connected in parallel to CT and a charge storage capacitor $C_2$ is connected parallel to $C_R$.

The sub-pixel structure as shown in FIG. 4 is known as a single-gap structure. In a single-gap transflective LCD, one of the major disadvantages is that transmittance of the transmission area (the V-T curve) and reflectance in the reflection area (the V-R curve) do not reach their peak values in the same voltage range, as shown in FIG. 5. As a result, the reflectance experiences an inversion while the transmittance is approaching its higher value. As shown in FIG. 5, the transmittance starts to peak around 4V but the reflectance is already in decline at about 2.7V.

In order to overcome this inversion problem, a dual-gap design is used in a transflective LCD. In a dual-gap transflective LCD, as shown in FIG. 6, the gap $G_R$ in the reflection area RA in the sub-pixel 12' is about half the gap $G_T$ in the transmission area TA. Thus, the thickness of the liquid crystal layer 190 in the reflection area RA is one half the thickness of the liquid layer 190 in the transmission area TA. As such, the transmittance and the reflectance of the LCD are more consistent with each other.

While the optical characteristics of a dual-gap transflective LCD are superior to those of a single-gap transflective LCD, the manufacturing process for controlling the gap in the reflection area in relation to the gap in the transmission area is complex. The production yield for dual-gap transflective LCDs is generally lower than that of single-gap transflective LCDs.

In order to make the transmittance and the reflectance of a single-gap LCD more consistent with each other, it is possible to reduce the voltage potential $V_R$ by applying an insulating film over part of the upper electrode. As shown in FIG. 7, the upper electrode of the sub-pixel 12" comprises two sections: a first electrode section 152 in the reflection area RA and a second electrode section 154 in the transmission area TA. An insulating film 220 is disposed between the first electrode section 152 and the liquid crystal layer 190. The first electrode section 152 can be directly disposed on the substrate 210, but the second electrode section 154 is disposed on top of an intermediate layer 222 in order to make the gap in the transmission area TA substantially equal to the gap in the reflection area RA. A drawback for this type of single-gap transflective LCD is that the manufacturing process for controlling the thickness of the insulating film over the first electrode section 152 is also complex. Furthermore, the insulating film 220 and the intermediate layer 222 must be sufficiently transparent and uniform so as not to affect the optical quality of the display panel.

It is thus advantageous and desirable to provide a method and device to improve the optical characteristics of a single-gap transflective LCD without significantly increasing the complexity in the manufacturing process.

SUMMARY OF THE INVENTION

The present invention uses a voltage divider within a sub-pixel of a LCD panel to reduce the voltage potential across part of the liquid crystal layer in the sub-pixel. In a normally-black transflective LCD panel, the voltage divider is used to reduce the voltage potential across the liquid crystal layer in the reflection area. In a normally-white transflective LCD panel, the voltage divider is used to reduce the voltage potential across the liquid crystal layer in the transmission area. The voltage divider comprises two resistor segments connected in series between a data line and a common line via one or more switching elements controlled by a gate line signal. In particular, the resistor segments are made of poly-silicon disposed on a lower substrate of the LCD panel. With poly-silicon resistor segments being disposed in the reflection area below the reflective electrode, the optical quality of the upper electrode and the transmissive electrode is not affected by the voltage divider.

BRIEF DESCRIPTION OF THE DRAWINGS

FIG. 9A is a schematic representation showing a cross sectional view of the sub-pixel of FIG. 8.

FIG. 9B is a schematic representation showing another cross sectional view of the sub-pixel of FIG. 8.

FIG. 13A is a schematic representation showing a cross sectional view of the sub-pixel of FIG. 12.

FIG. 13B is a schematic representation showing another cross sectional view of the sub-pixel of FIG. 12.

DETAILED DESCRIPTION OF THE INVENTION

The present invention uses a voltage divider to reduce the voltage level on the reflective electrode in color sub-pixel. In particular, poly-silicon is used to fabricate the resistors in the voltage divider under the reflective electrode in the reflection area.

Figure 8:
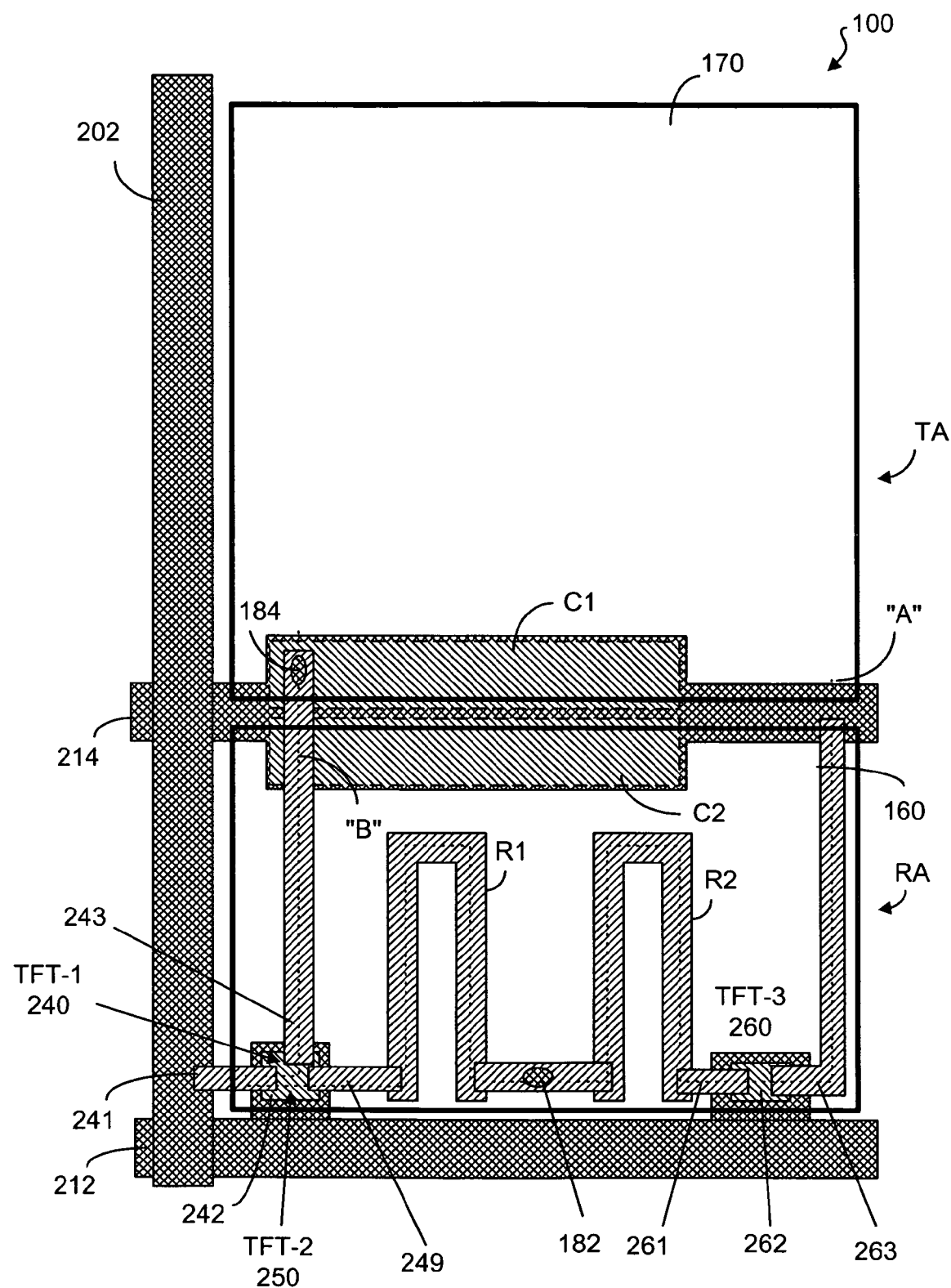
FIG. 8 is a schematic representation of a sub-pixel in a single-gap transflective LCD panel, according to the present invention.

A sub-pixel in a normally-black (NB) transflective LCD panel, according to the present invention, is shown in FIG. 8. As shown, the sub-pixel 100 has a data line 202 for providing a data line signal to the sub-pixel 100, a gate line 212 for providing a gate line signal to a switching element that controls the liquid crystal layer within the sub-pixel, and a common line 214 for providing a common line voltage level Vcom to the upper electrode (not shown). The sub-pixel 100 is divided into a transmission area TA and a reflection area RA. The transmission area TA has a transmissive electrode 170 operatively connected to the data line 202 via a switching element 240 (TFT-1) in order to receive the data line signal. The switching element 240 has a switch end 241 electrically connected to the data line 202 and another switch end 243 connected to the transmissive electrode 170 through a via 184. A charge storage capacitor $C_1$ is also electrically connected to the switch end 243. The switching element 240 also has a control end 242 electrically connected to the gate line 212. The reflection area RA has a reflective electrode 160 operatively connected to the data line 202 via a switching element 250 (TFT-2) in order to receive the data line signal. The switching element 250 shares the switch end 241 and the control end 242 with the switching element 240. The switching element 250 has another switch end 249 connected to a voltage divider ($R_1+R_2$).

In order to reduce the voltage potential across the liquid crystal layer in the reflection area RA, a voltage divider ($R_1+R_2$) consisting of a resistor $R_1$ and a resistor $R_2$ is disposed in the reflection area RA to establish a voltage potential between the switching element 250 and the common line 214 via another switching element 260 (TFT-3). As shown in FIG. 8, one end of the resistor $R_1$ is connected to the switch end 249 of the switching element 250 and the other end is connected to the reflective electrode 160 through a via 182. A charge storage capacitor $C_2$ is also electrically connected to the reflective electrode 160. One end of the resistor $R_2$ is electrically connected to the reflective electrode 160 and the other end of the resistor $R_2$ is connected to a switch end 261 of the switching element 260. The other switch end 263 of the switching element 260 is connected to the common line 214 and the control end 262 is connected to the gate line 212.

The voltage divider ($R_1+R_2$) is achievable due to the availability of the low-temperature poly-silicon (LTPS) process. LTPS can also be used to fabricate part of the switching elements 240, 250, 260. FIG. 9A is a schematic representation of a cross sectional view along a line "A" as shown in FIG. 8. FIG. 9A shows how poly-silicon is used to fabricate the resistors $R_1$, $R_2$ and part of the switching elements 250, 260. As shown in FIGS. 8 and 9A, the resistors $R_1$ and $R_2$ are disposed below the reflective electrode 160. As such, the voltage divider can be fabricated within the sub-pixel 100 without effecting the reflectivity in the reflection area RA or the transmissivity in the transmission area TA. FIG. 9B is a schematic representation of a cross sectional view along a line "B" as shown in FIG. 8. FIG. 9B shows how poly-silicon can be used to fabricate part of the switching elements 240.

Figure 1:
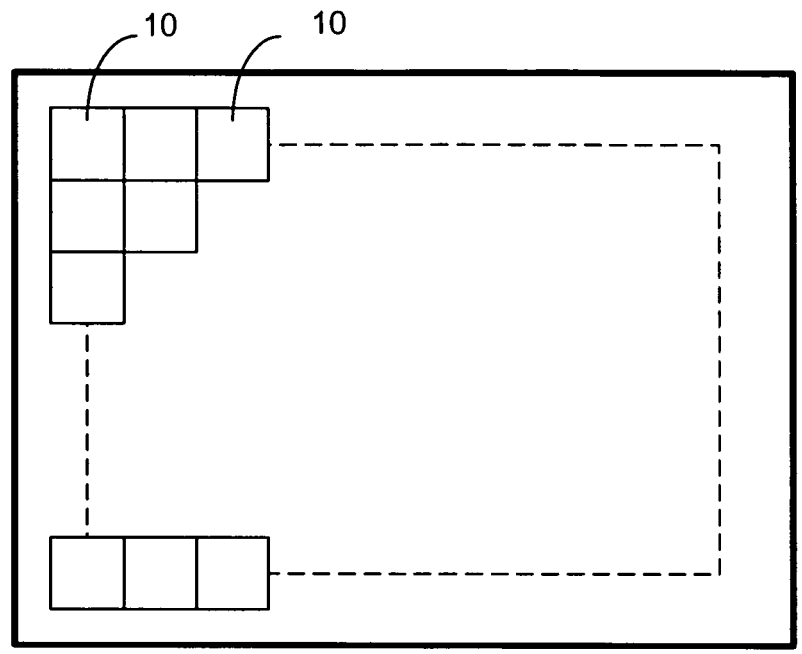
FIG. 1 is a schematic representation of a typical LCD panel.
Figure 2:
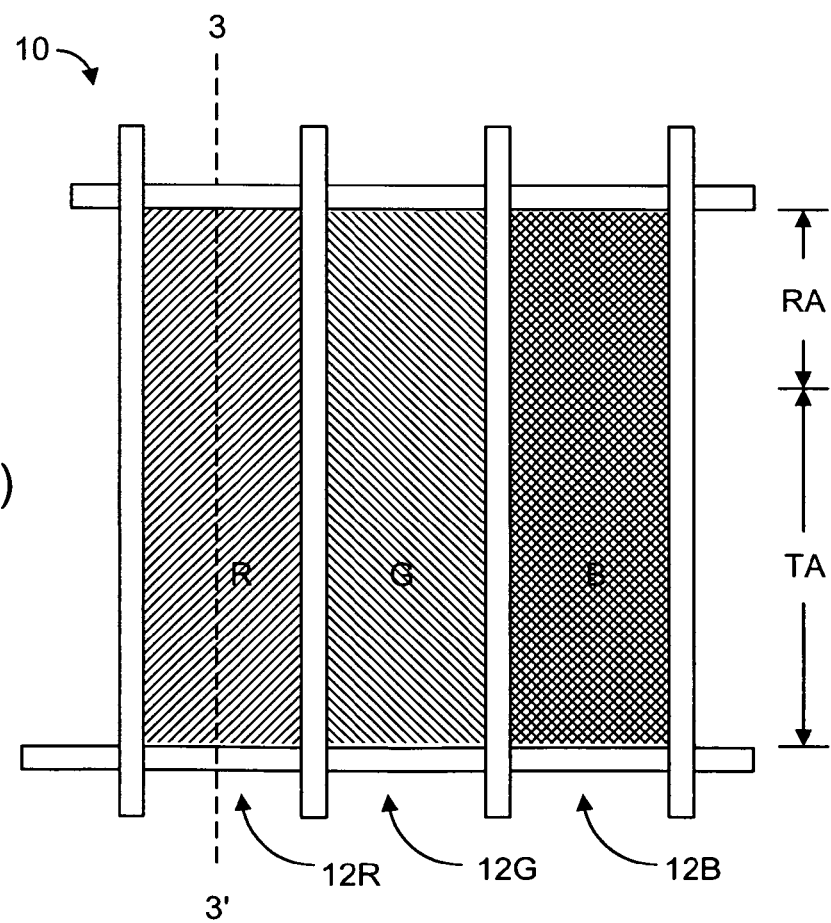
FIG. 2 is a schematic representation showing a plan view of the pixel structure of a conventional transflective color LCD panel.
Figure 3:
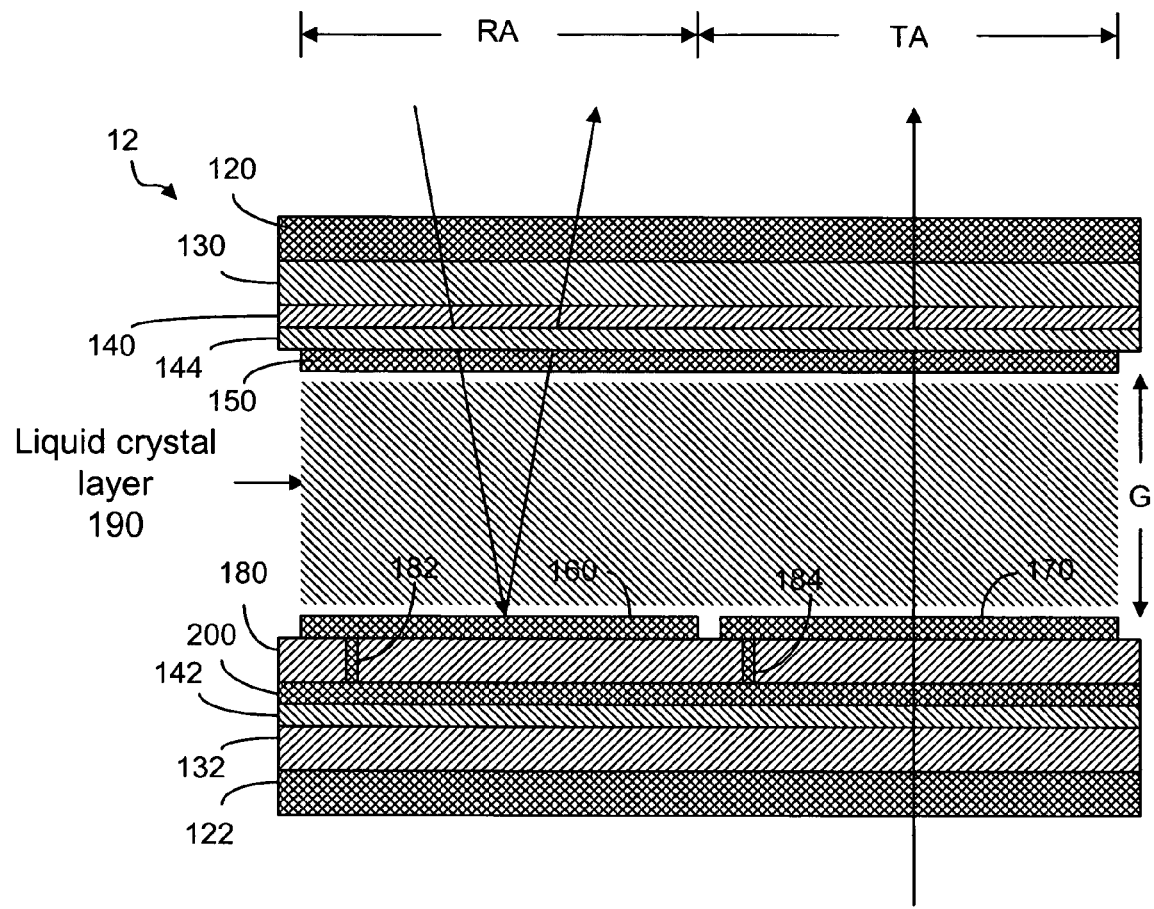
FIG. 3 is schematic representation showing a cross sectional view of a sub-pixel of the conventional transflective color LCD panel and the reflection and transmission of light beams in the sub-pixel.
Figure 4:
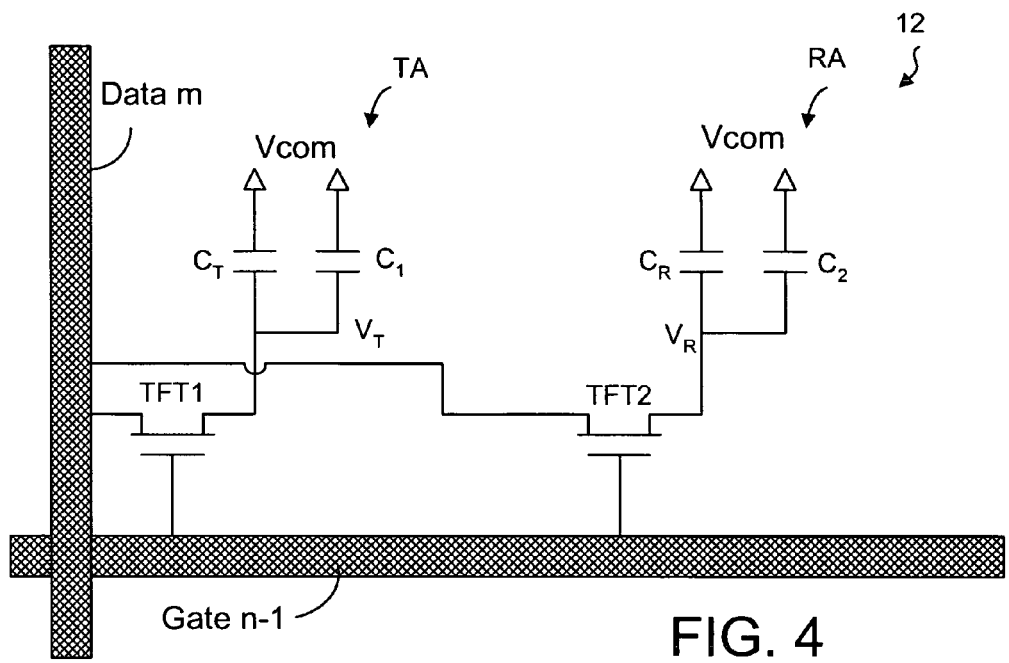
FIG. 4 shows an equivalent circuit of a sub-pixel in the conventional transflective LCD panel.
Figure 10:
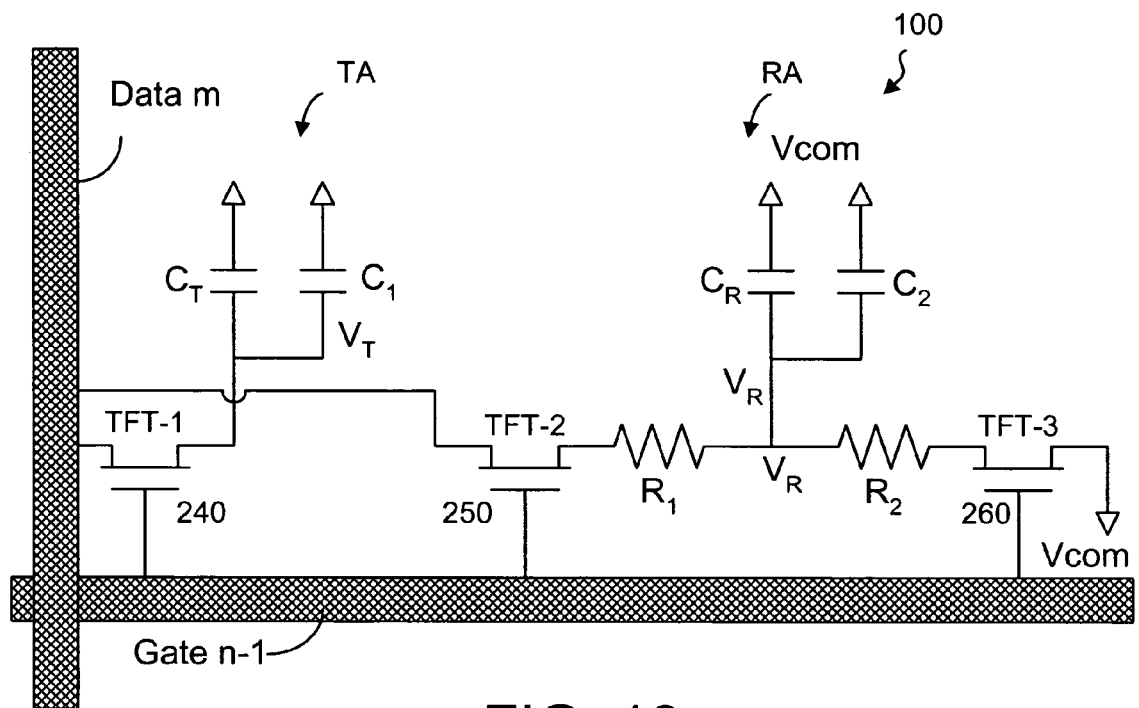
FIG. 10 shows an equivalent circuit of the sub-pixel of FIG. 8.
Figure 11:
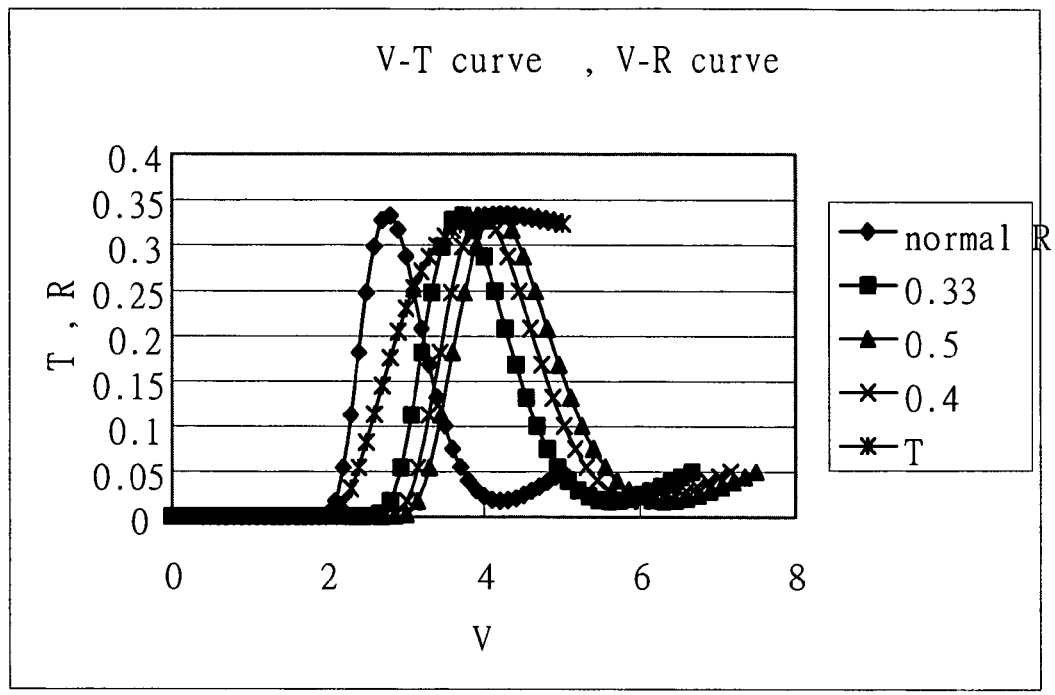
FIG. 11 shows the transmittance and reflectance of a sub-pixel in a normally black LCD panel, according to the present invention.

FIG. 10 shows an equivalent circuit of the sub-pixel 100 as shown in FIG. 8. In FIG. 10, $C_T$ is the capacitance of the liquid crystal layer between the transmissive electrode 170 and the upper electrode (see electrode 150 in FIG. 3) and $C_R$ is the capacitance of the liquid crystal layer between the reflective electrode 160 and the upper electrode. As shown, the charge storage capacitor $C_1$ is connected in parallel to $C_T$, and the charge capacitor $C_2$ is connected in parallel to $C_R$. When the switching element TFT-1 is switched "on" by a gate line signal in Gate n−1 and the capacitors $C_2$, $C_R$ are substantially charged, the voltage level on the transmissive electrode is $V_T$=Vdata, where Vdata is the voltage level at Data m. The voltage potential across the liquid crystal layer in the transmission area TA is (Vdata−Vcom). When the switching elements TFT-2, TFT-3 are switched "on" by the gate line signal in Gate n−1 and the capacitors $C_1$, $C_T$ are substantially charged, the voltage level on the reflective electrode is $V_R$=(Vdata−Vcom) ($R_1/(R_1+R_2)$). Thus, the voltage potential across the liquid crystal layer in the reflection area RA is $V_R$−Vcom. If Vcom is small as compared to Vdata, then the voltage potential across the liquid crystal layer in the reflection area RA is approximately reduced by $R_1/(R_1+R_2)$. As a result, the reflectance is shifted toward the higher voltage end of the V-R curve, as shown in FIG. 11. The shifting is dependant upon the ratio $R_1/(R_1+R_2)$. FIG. 11 shows the shifting according to the ratios 0.33, 0.4 and 0.5. As such, the reflectance inversion problem of the reflectance can be avoided by choosing a suitable voltage range for controlling the liquid crystal layer.

Figure 12:
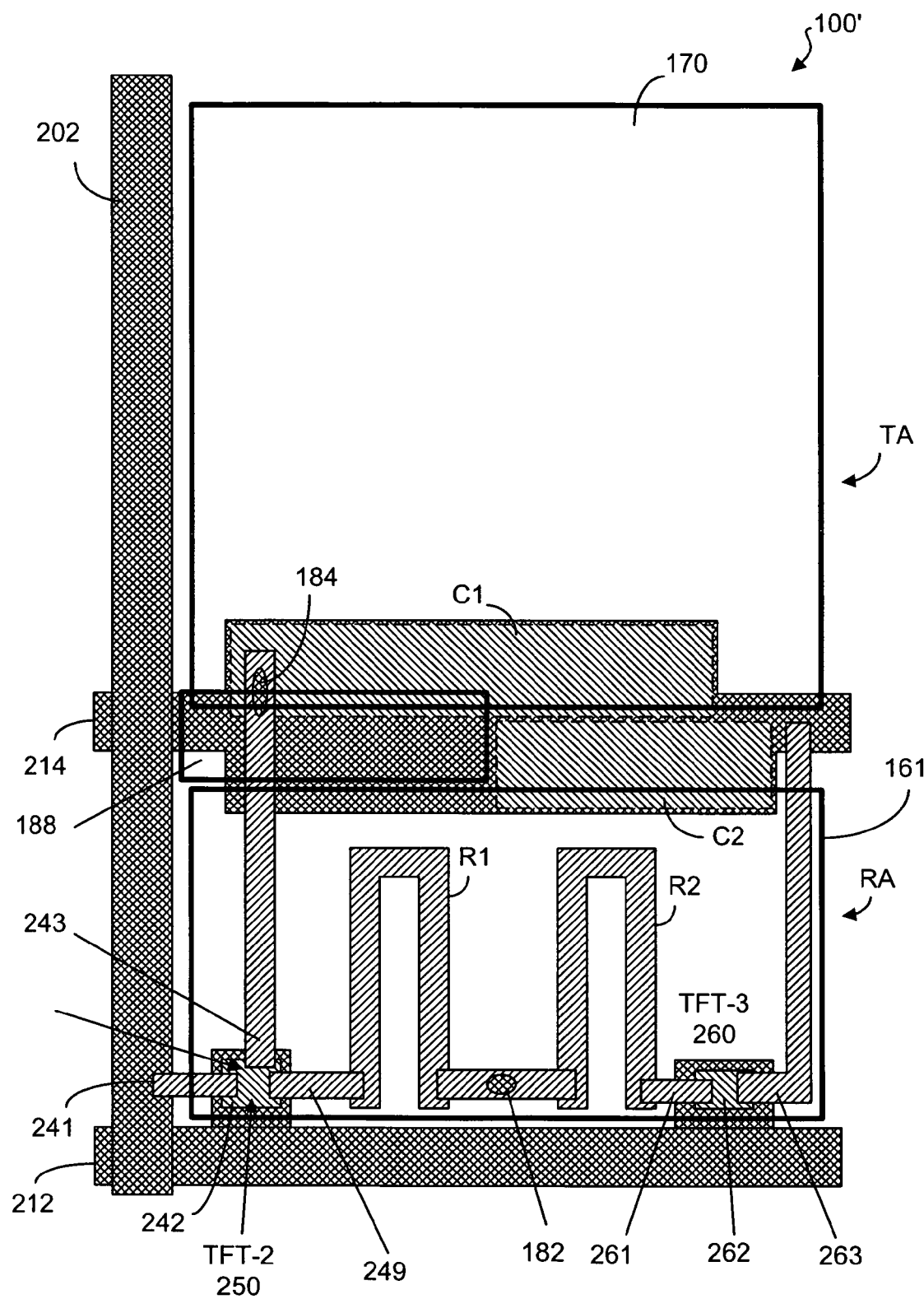
FIG. 12 is a schematic representation showing a sub-pixel in a single-gap transflective LCD panel, according to another embodiment of the present invention.

According to another embodiment of the present invention, the reflection area RA in the sub-pixel 100' has two reflective electrodes 161 and 188, as shown in FIG. 12. The reflective electrode 188 is electrically connected to the transmissive electrode 170. As with the embodiment as shown in FIG. 8, the voltage level on the reflective electrode 161 is reduced by the voltage divider ($R_1+R_2$) in order to avoid the reflectance inversion problem. A cross sectional view of this embodiment is shown in FIGS. 13A and 13B, similar to the cross sectional views along the line "A" and the line "B", respectively, as shown in FIGS. 9A and 9B.

Figure 14:
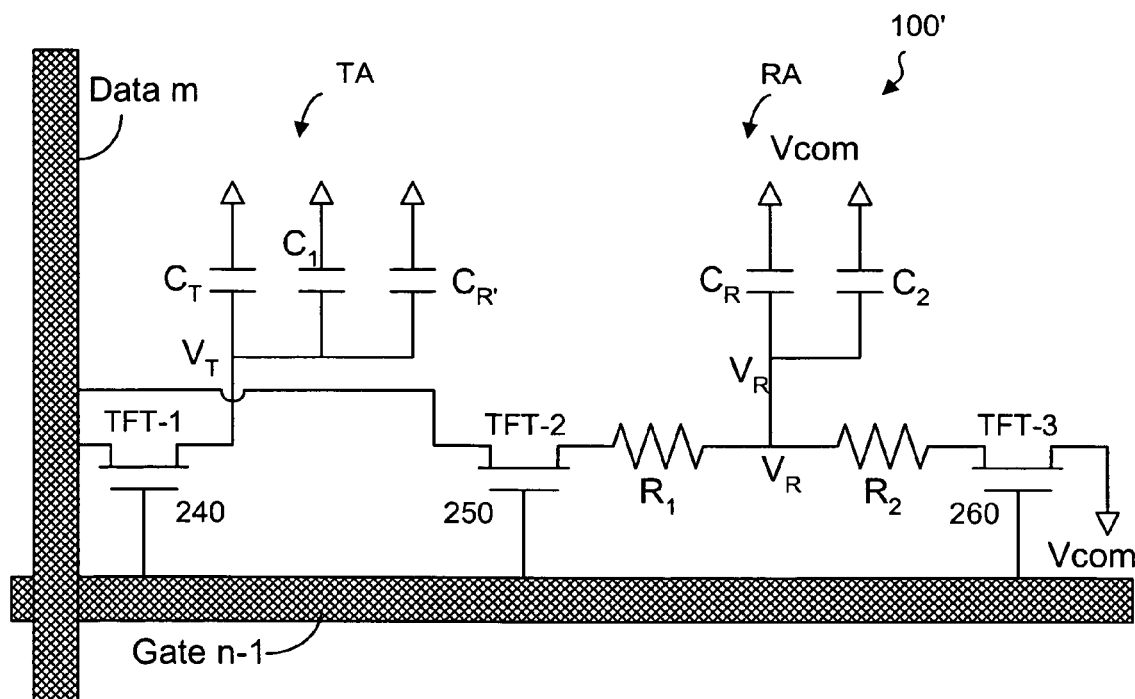
FIG. 14 shows an equivalent circuit of the sub-pixel of FIG. 12.

The equivalent circuit of the sub-pixel 100' is shown in FIG. 14. In FIG. 14, $C_R'$ is the capacitance of the liquid crystal layer between the reflective electrode 188 and the upper electrode (not shown), and $C_R$ is the capacitance of the liquid crystal layer between the reflective electrode 161 and the upper electrode. As such, part of the reflectance in the reflection area is not shifted. This unshifted portion of the reflectance improves the matching between transmittance and reflectance at the starting end of the V-T, V-R curves.

Figure 15:
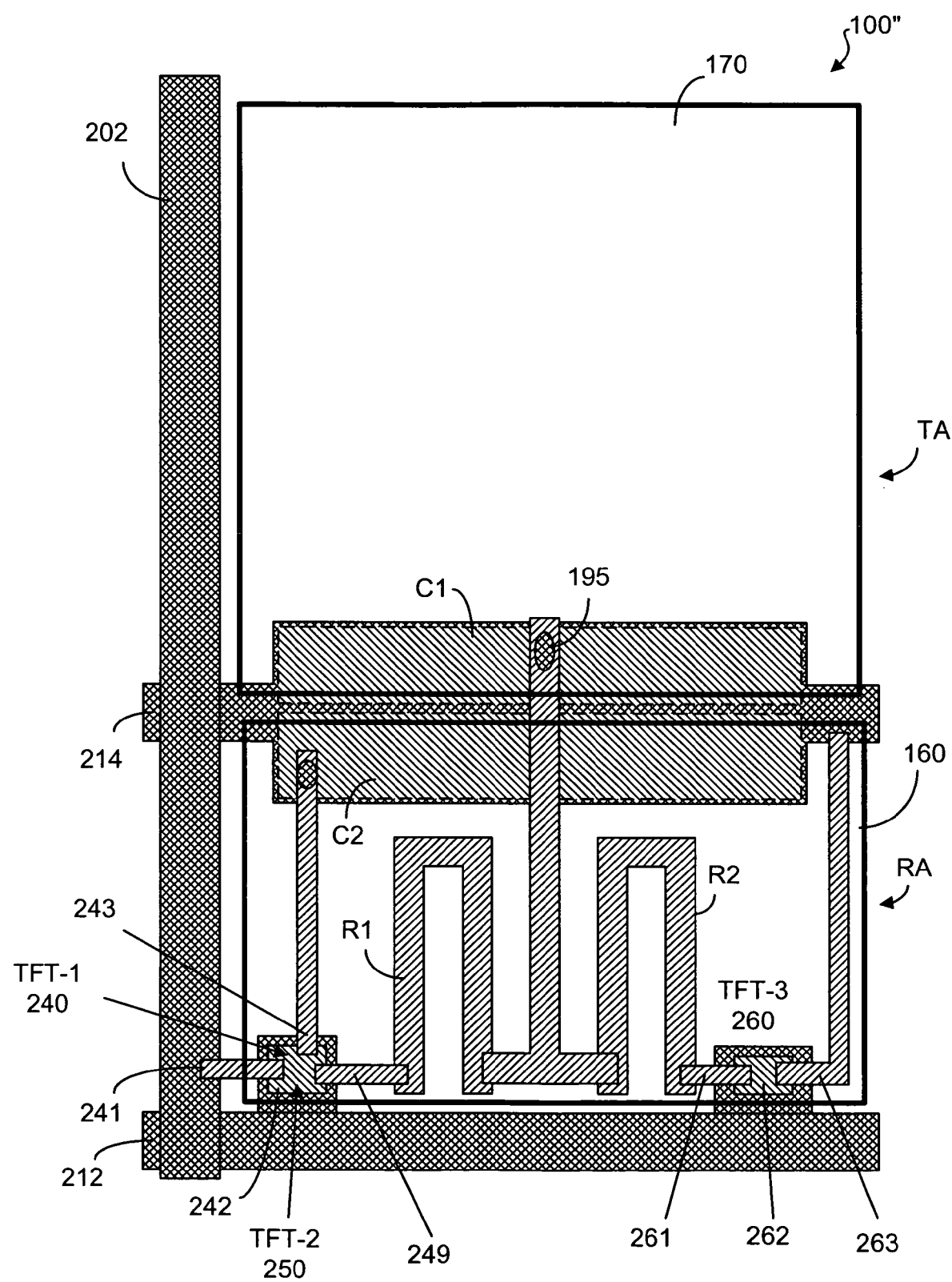
FIG. 15 is a schematic representation of a sub-pixel in another single-gap transflective LCD panel, according to the present invention.

A sub-pixel in a normally-white (NW) transflective LCD panel, according to the present invention, is shown in FIG. 15. As shown, the sub-pixel 100" has a data line 202 for providing a data line signal to the sub-pixel 100", a gate line 212 for providing a gate line signal to a switching element that controls the liquid crystal layer within the sub-pixel, and a common line 214 for providing a common line voltage level Vcom to the upper electrode (not shown). The sub-pixel 100" is divided into a transmission area TA and a reflection area RA. The reflection area RA has a reflective electrode 160 operatively connected to the data line 202 via a switching element 240 (TFT-1) in order to receive the data line signal. The switching element 240 has a switch end 241 electrically connected to the data line 202 and another switch end 243 connected to the reflective electrode 160 through a via 193. A charge storage capacitor $C_2$ is also electrically connected to the switch end 243. The switching element 240 also has a control end 242 electrically connected to the gate line 212. The transmission area TA has a transmissive electrode 170 operatively connected to the data line 202 via a switching element 250 (TFT-2) in order to receive the data line signal. The switching element 250 shares the switch end 241 and the control end 242 with the switching element 240. The switching element 250 has another switch end 249 connected to a voltage divider.

In order to reduce the voltage potential across the liquid crystal layer in the transmission area TA, a voltage divider consisting of a resistor $R_1$ and a resistor $R_2$ is disposed in the transmission area TA to establish a voltage potential between the switching element 250 and the common line 214 via another switching element 260 (TFT-3). As shown in FIG. 15, one end of the resistor $R_1$ is connected to the switch end 249 of the switching element 250 and the other end is connected to the transmissive electrode 170 through a via 195. A charge storage capacitor $C_1$ is also electrically connected to the transmissive electrode 170. One end of the resistor $R_2$ is electrically connected to the transmissive electrode 170 and the other end of the resistor $R_2$ is connected to a switch end 261 of the switching element 260. The other switch end 263 of the switching element 260 is connected to the common line 214 and the control end 262 is connected to the gate line 212.

Figure 17:
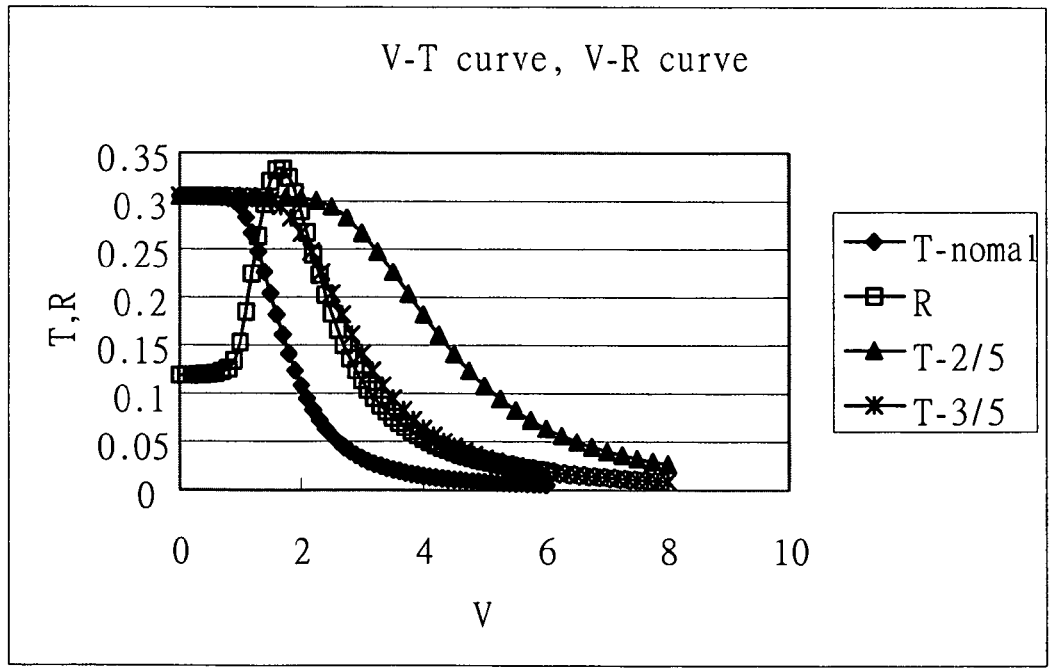
FIG. 17 shows the transmittance and reflectance of a sub-pixel in a normally white LCD panel, according to the present invention.
Figure 16:
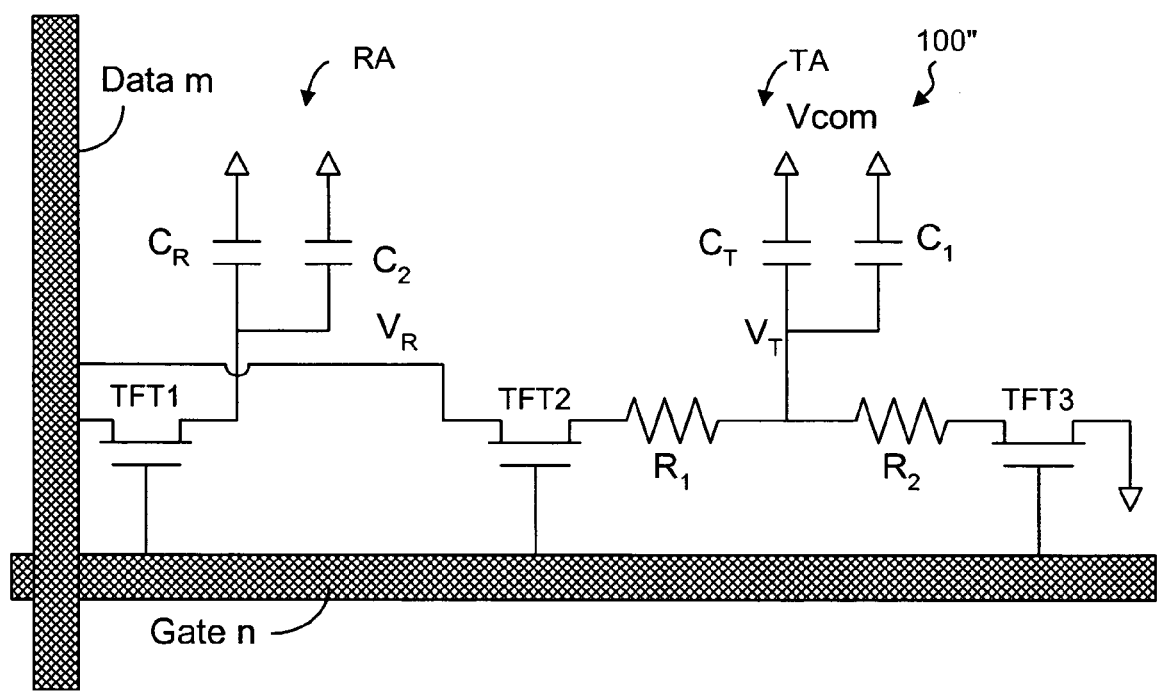
FIG. 16 shows an equivalent circuit of the sub-pixel of FIG. 15.

FIG. 16 shows an equivalent circuit of the sub-pixel 100" as shown in FIG. 15. In FIG. 16, $C_T$ is the capacitance of the liquid crystal layer between the transmissive electrode 170 and the upper electrode (see electrode 150 in FIG. 3), and $C_R$ is the capacitance of the liquid crystal layer between the reflective electrode 160 and the upper electrode. As shown, the charge storage capacitor $C_1$ is connected in parallel to $C_T$ and the charge capacitor $C_2$ is connected in parallel to $C_R$. When the switching element TFT-1 is switched "on" by a gate line signal in Gate n−1 and the capacitors $C_2$, $C_R$ are substantially charged, the voltage level on the reflective electrode is $V_R$=Vdata, where Vdata is the voltage level at Data m. The voltage potential across the liquid crystal layer in the reflection area is (Vdata−Vcom). When the switching elements TFT-2, TFT-3 are switched "on" by the gate line signal in Gate n−1 and the capacitors $C_1$, $C_T$ are substantially charged, the voltage level on the transmissive electrode is VT=(Vdata−Vcom)($R_1/(R_1+R_2)$). Thus, the voltage potential across the liquid crystal layer in the transmission area is $V_T$−Vcom. If Vcom is small as compared to Vdata, then the voltage potential across the liquid crystal layer in the transmission area is approximately reduced by $R_1/(R_1+R_2)$. As a result, the transmission is shifted toward the higher voltage end of the V-T curve, as shown in FIG. 17. The shifting is dependant upon the ratio $R_1/(R_1+R_2)$. FIG. 17 shows the shifting according to the ratios 0.4 and 0.6. As such, the reflectance inversion problem of the reflectance can be avoided by choosing a suitable voltage range for controlling the liquid crystal layer.

Figure 5:
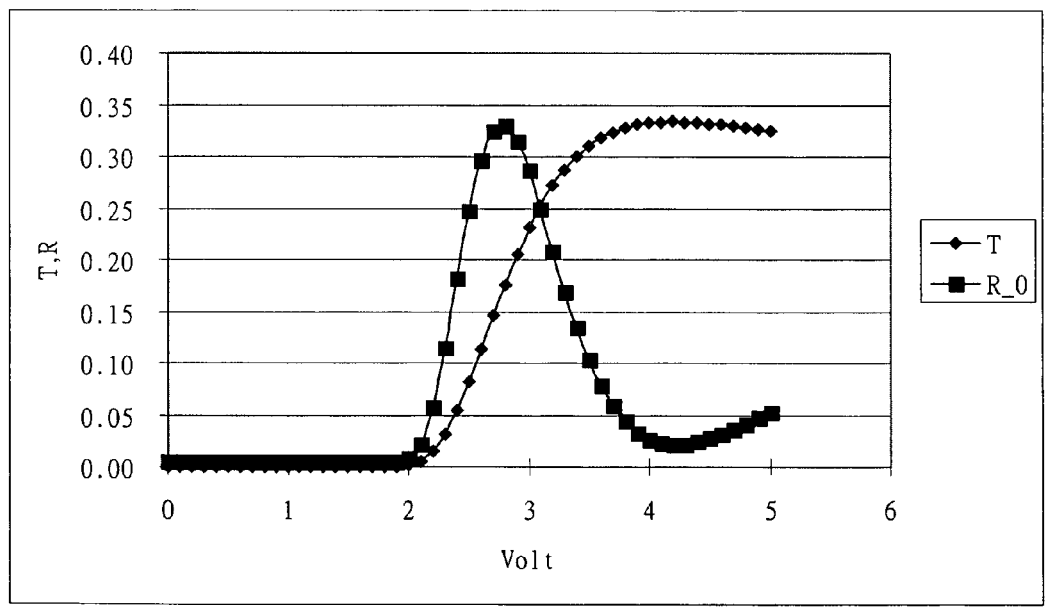
FIG. 5 shows the transmittance and reflectance of a sub-pixel in a conventional normally black LCD panel.
Figure 6:
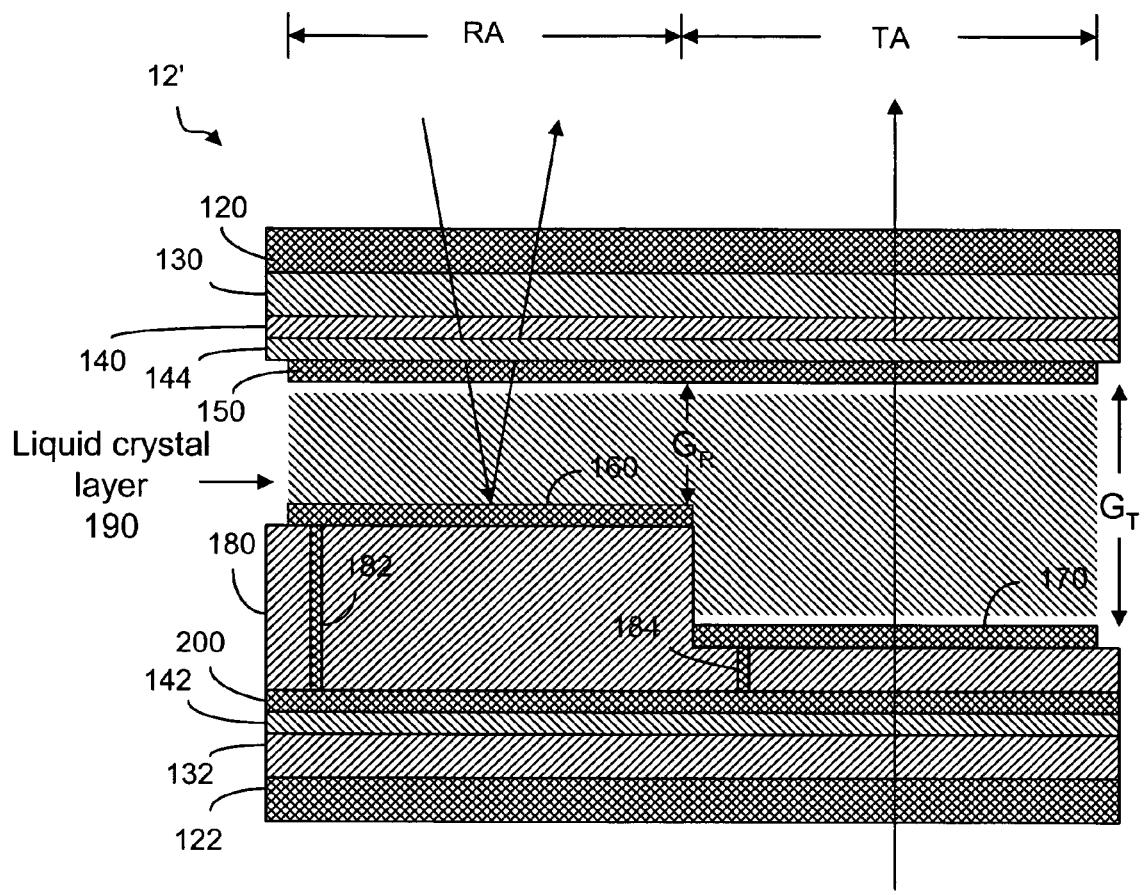
FIG. 6 is a schematic representation of a sub-pixel in a prior art double-gap transflective LCD panel.
Figure 7:
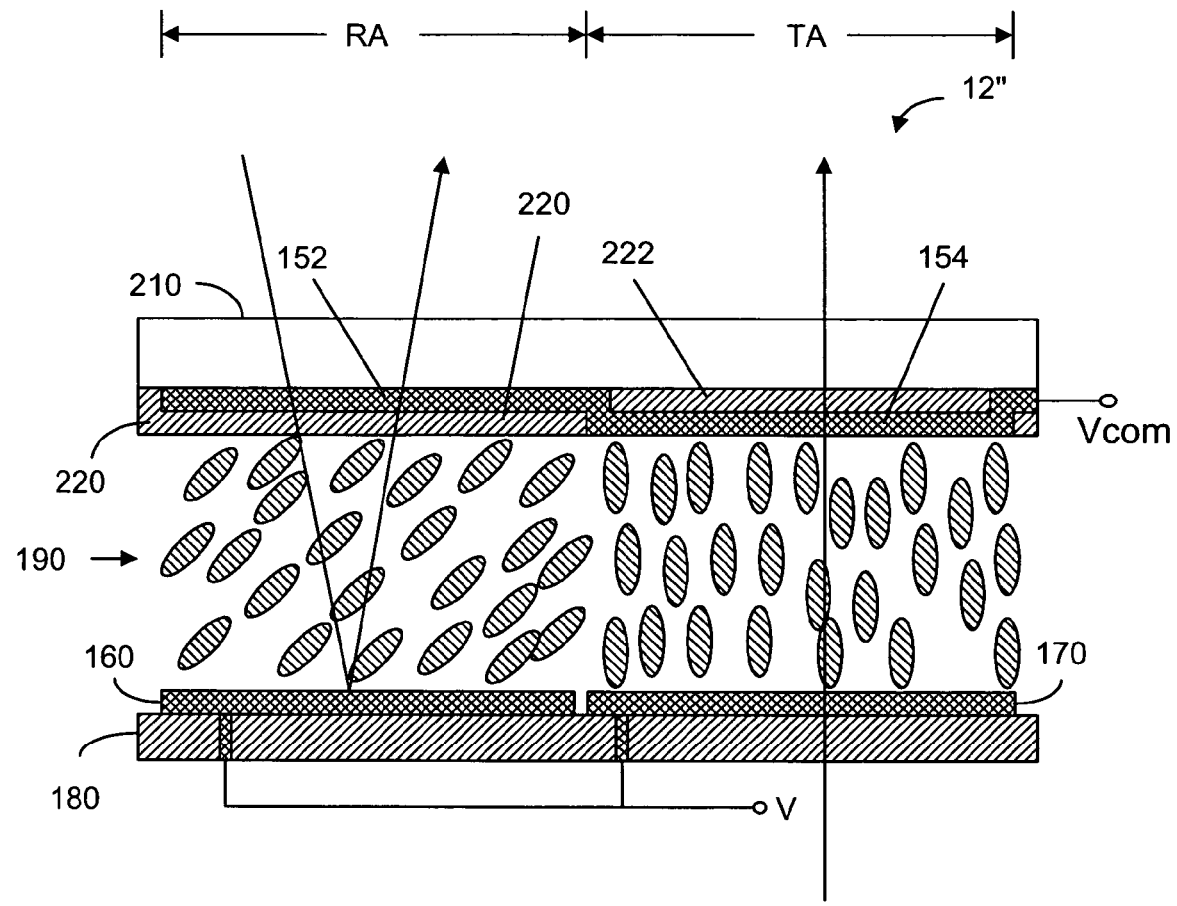
FIG. 7 is a schematic representation of a sub-pixel in a prior art single-gap transflective LCD panel wherein the voltage potential in the reflection area is reduced.
Figure 18:
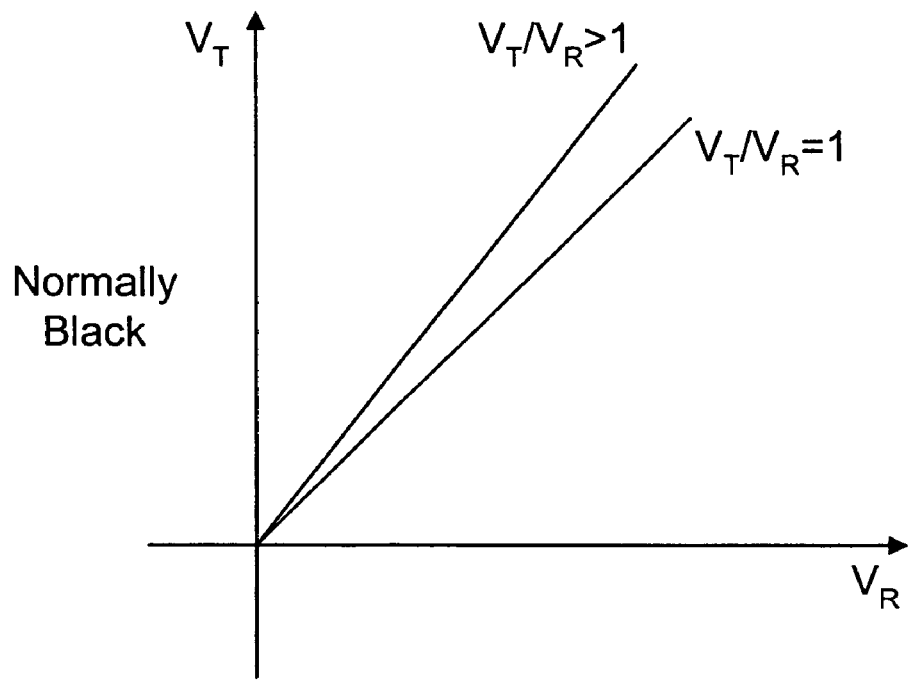
FIG. 18 shows the relationship between the voltage level on the transmissive electrode and that on the reflective electrode in a normally black LCD panel.

As shown in FIGS. 5 and 11, when $V_T$ is equal to $V_R$ in a single-gap, normally-black LCD panel, the reflectance peaks at a much lower voltage level than the transmittance. Thus, it is desirable to reduce the voltage level on the reflective electrode such that $V_T/V_R>1$, as shown in FIG. 18, so as to match reflectance to transmittance within a certain range. To further illustrate the problem associated with $V_T=V_R$ in a single-gap, normally-black LCD panel, a plot of reflectance against transmittance is shown in FIG. 19a.

Figure 19A:
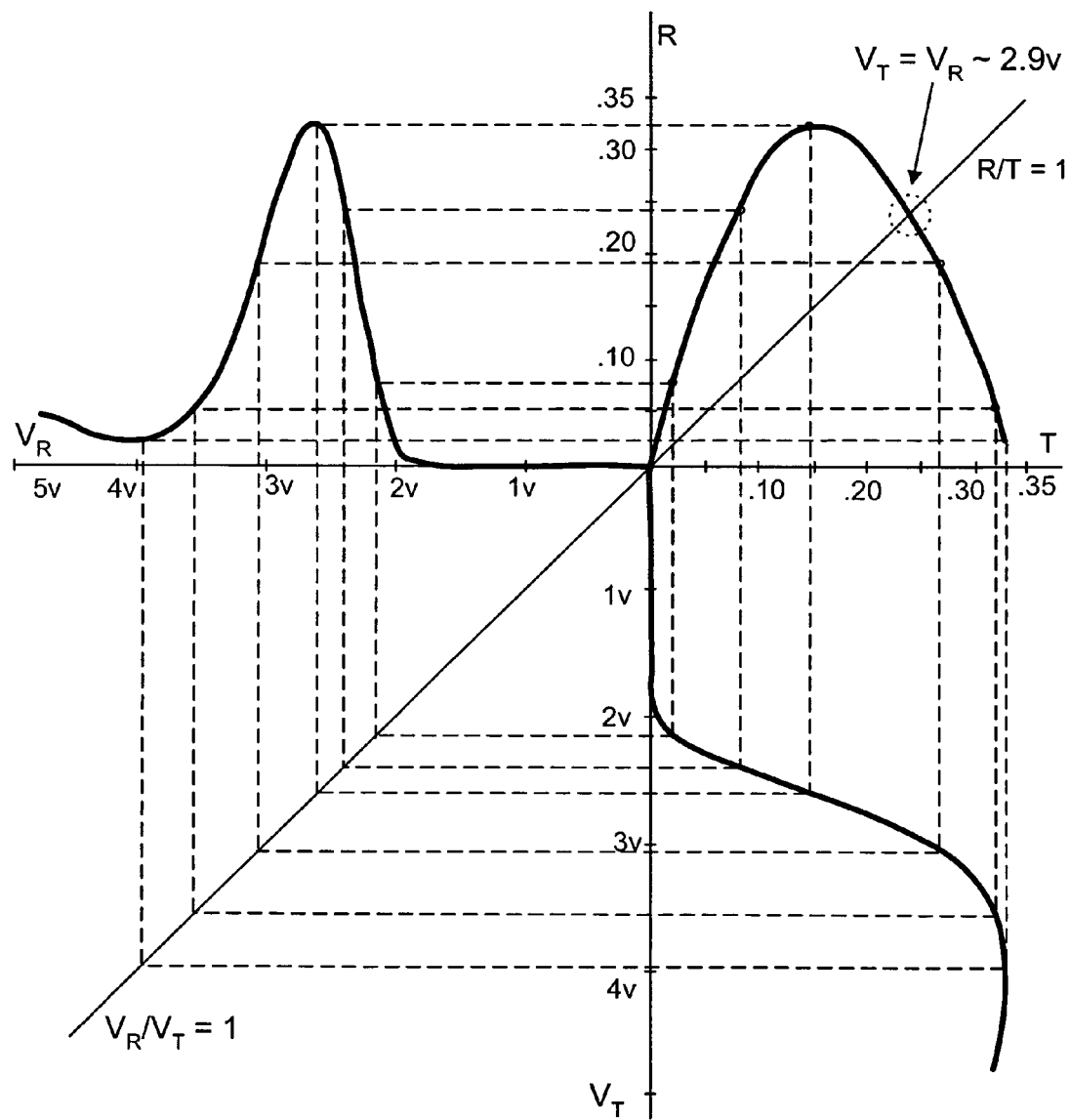
FIG. 19a shows the relationship between the transmittance and reflectance when the voltage level of the transmissive electrode is equal to that on the reflective electrode in a normally black LCD panel.

As shown in FIG. 19a, the reflectance peaks approximately at $V_R=2.7V$ and the transmittance peaks approximately at $V_T=4V$. In a quality LCD display, the ratio between transmittance and reflectance should be within a certain range in order to achieve a plurality of gray-scale levels. Thus, the R-T curve should approximately follow the R/T=1 slope. However, as shown in FIG. 19a, the transmittance is approximately equal to the reflectance only around $V_T=V_R=2.9V$. At other voltage levels, the discrepancy between transmittance and reflectance is too great to be useful. Thus, a useful range of gray-scale levels is not achievable.

Figure 19B:
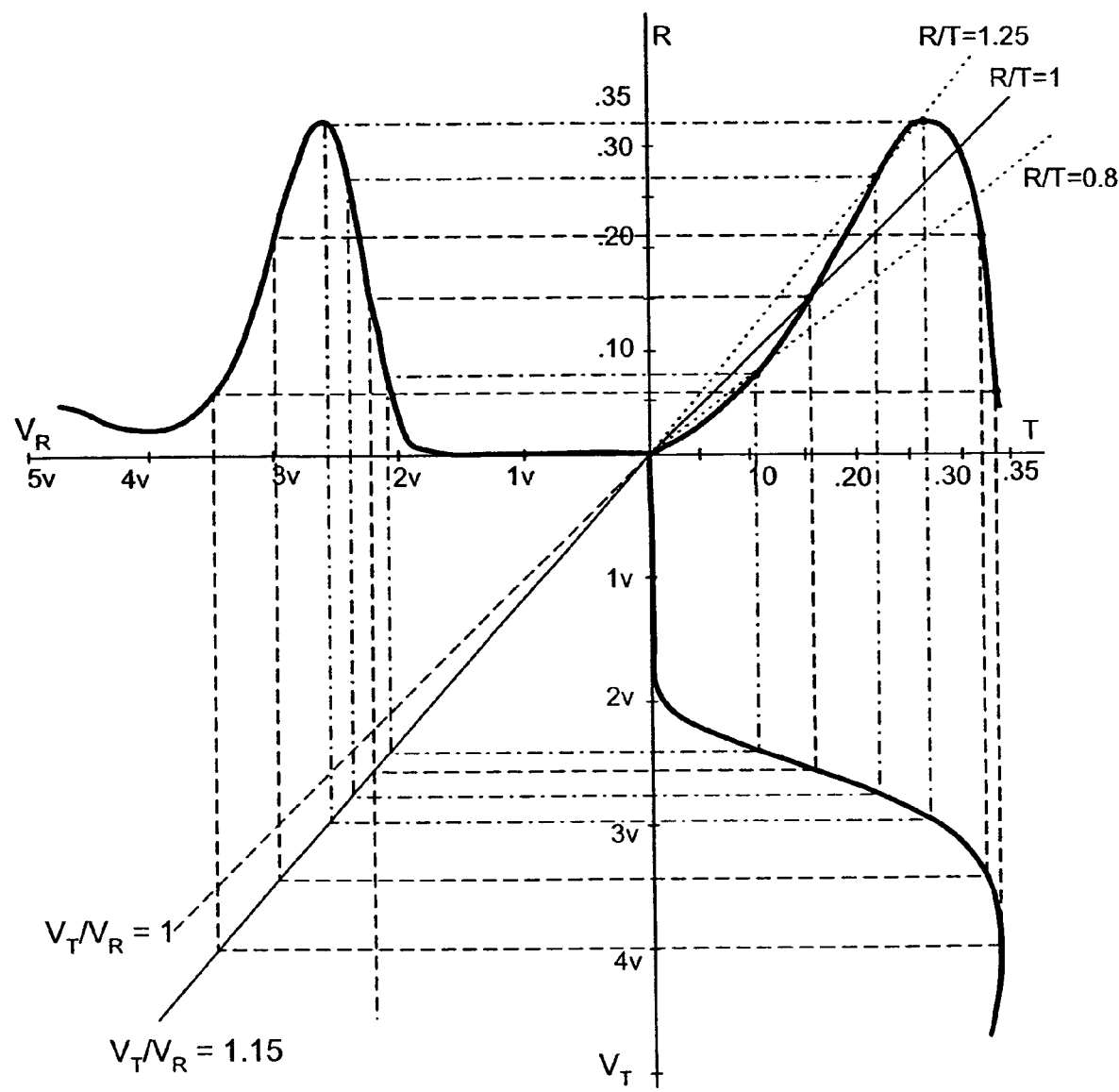
FIG. 19b shows the relationship between the transmittance and reflectance when the voltage level of the transmissive electrode is lower than that on the reflective electrode in a normally black LCD panel.

As shown in FIG. 11, when $(V_R/V_T)<1$, the peak of the V-R curve shifts toward the peak of the V-T curve. FIG. 19b shows the relationship between transmittance and reflectance when the voltage divider is designed such that $R_1/(R_1+R_2) \sim (V_R/V_T)=0.87$. As shown in FIG. 19b, when $V_T$ is approximately in the range of 2.4V to 3.3V ($V_R$ in the range of 2.1V to 2.9V), the ratio R/T is approximately in the range of 0.8 to 1.25. Thus, with $R_1/(R_1+R_2) \sim (V_R/V_T)=0.87$, the reasonable operational $V_T$ voltage range of the LCD panel is 2.4V to 3.3V.

Figure 20:
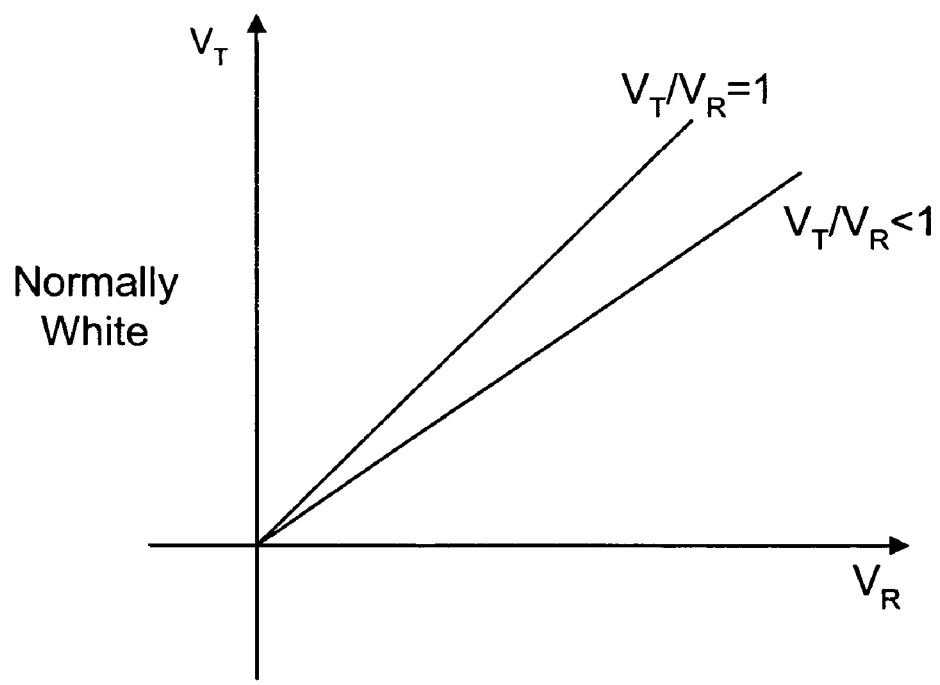
FIG. 20 shows the relationship between the voltage level on the transmissive electrode and that on the reflective electrode in a normally white LCD panel.

As shown in FIG. 17, when $V_T$ is equal to $V_R$ in a single-gap, normally-white LCD panel, the reflectance peaks at a much higher voltage level than the transmittance. Thus, it is desirable to increase the voltage level on the reflective electrode such that $V_T/V_R<1$, as shown in FIG. 20, so that the ratio of transmittance to reflectance falls within a certain range. To further illustrate the problem associated with $V_T=V_R$ in a single-gap, normally-white LCD panel, a plot of reflectance against transmittance is shown in FIG. 21a.

Figure 21A:
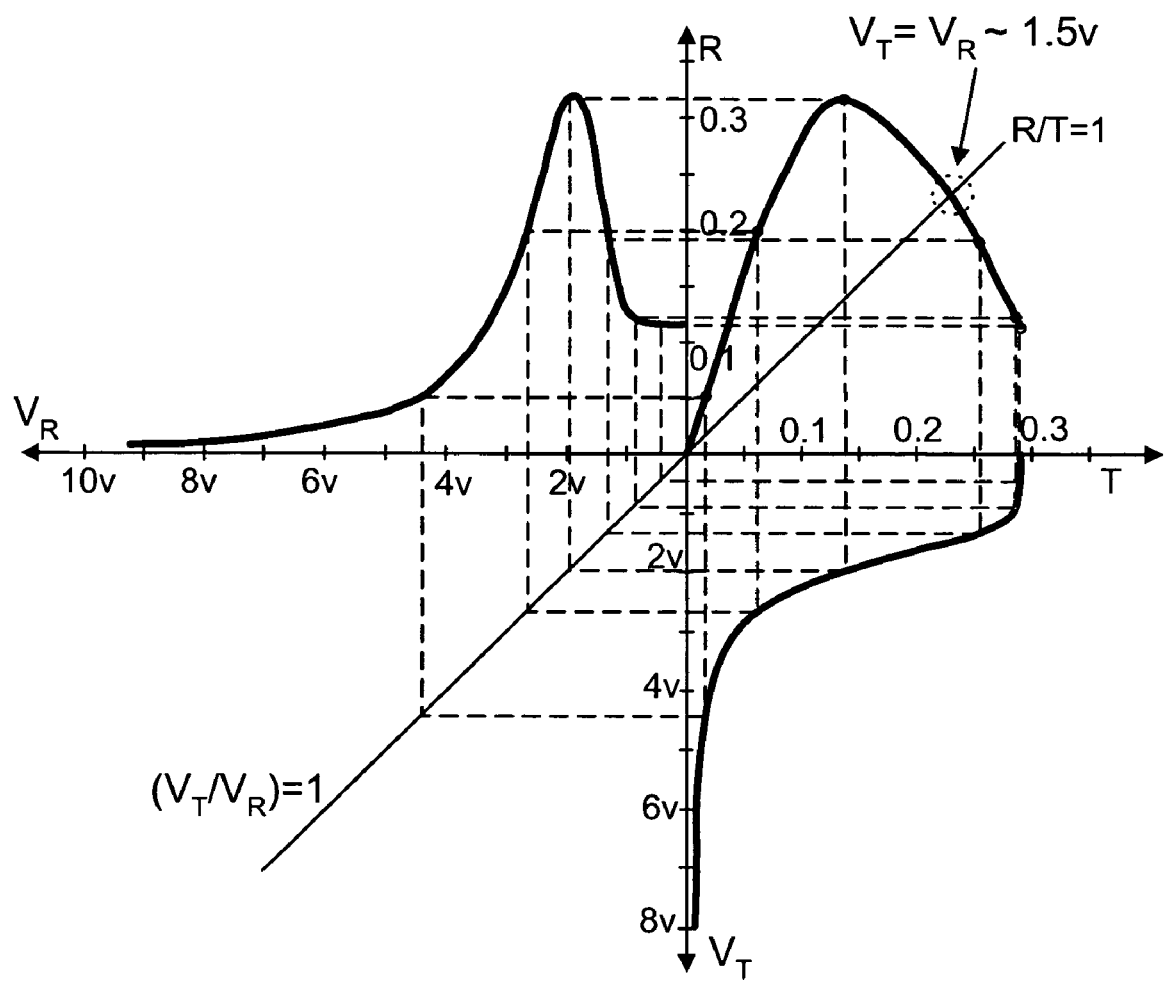
FIG. 21a shows the relationship between the transmittance and reflectance when the voltage level of the transmissive electrode is equal to that on the reflective electrode in a normally white LCD panel.

As shown in FIG. 21a, before the reflectance peaks approximately at $V_R=2.0V$, the transmittance already decreases from about 0.29 to 0.14. The transmittance is approximately equal to the reflectance only around $V_T=V_R=1.5V$. At other voltage levels, the discrepancy between the transmittance and reflectance is too great to be useful.

Figure 21B:
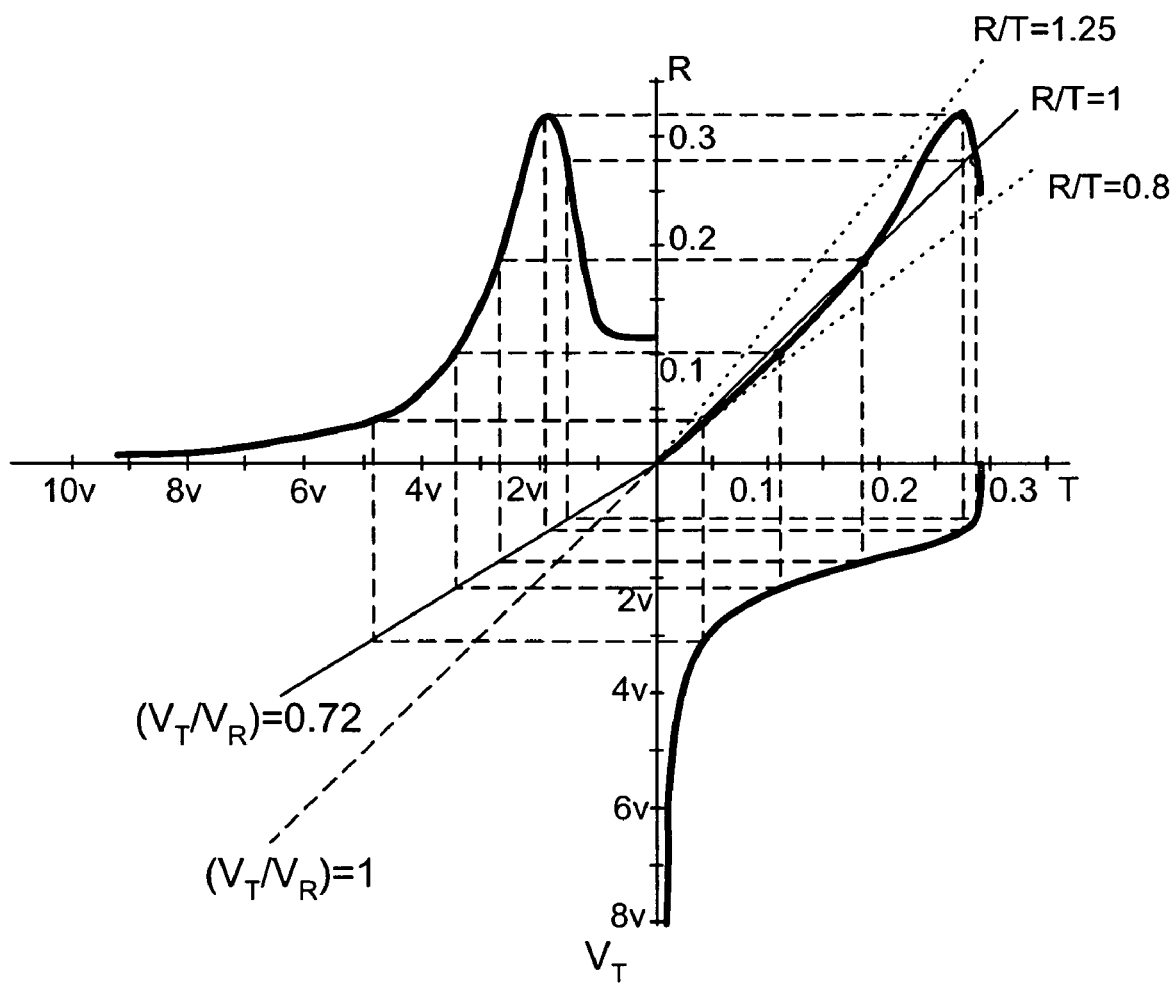
FIG. 21b shows the relationship between the transmittance and reflectance when the voltage level of the transmissive electrode is higher than that on the reflective electrode in a normally white LCD panel.

As shown in FIG. 17, when $(V_R/V_T)>1$, the downward slope of the V-T curve shifts toward the downward slope of the V-R curve. FIG. 21b shows the relationship between transmittance and reflectance when the voltage divider is designed such that $R_1/(R_1+R_2) \sim (V_T/V_R)=0.72$. As shown in FIG. 21b, when $V_T$ is approximately in the range of 1.1V to 4.3V ($V_R$ in the range of 1.5V to 6V), the ratio R/T is approximately in the range of 0.8 to 1.25. Thus, with $R_1/(R_1+R_2) \sim (V_T/V_R)=0.72$, the reasonable operational $V_R$ voltage range of the LCD panel is 1.5V to 6V.

In sum, the present invention uses a voltage divider in a single-gap, normally-black transflective LCD panel to reduce the $V_R/V_T$ ratio so as to reduce the discrepancy between transmittance and reflectance. In one embodiment, only one reflective electrode is provided in the reflection area to effect the reflection, and the voltage divider is operatively connected to the reflective electrode for reducing the $V_R/V_T$ ratio. In another embodiment, two reflective electrodes are used to effect the reflection, one reflective electrode is operatively connected to the transmissive electrode and the other reflective electrode is operatively connected to the voltage divider for reducing the $V_R/V_T$ ratio. The present invention also uses a voltage divider in a single-gap, normally-white LCD panel to reduce the $V_T/V_R$ ratio so as to reduce the discrepancy between transmittance and reflectance. In particular, poly-silicon is used to fabricate the resistors in the voltage divider. These resistors can be located beneath the reflective electrode in the reflection area, for example.

Thus, although the invention has been described with respect to one or more embodiments thereof, it will be understood by those skilled in the art that the foregoing and various other changes, omissions and deviations in the form and detail thereof may be made without departing from the scope of this invention.

What is claimed is:

1. A method for improving optical characteristics of a single-gap transflective liquid crystal display panel having a plurality of pixels, at least some of the pixels having a transmission area and a reflection area, wherein the transmission area comprises a transmissive electrode and the reflection area comprises a reflective electrode, said method comprising the steps of:

providing a first voltage level to the transmissive electrode to achieve a transmittance in the transmission area;

providing a second voltage level to the reflective electrode to achieve a reflectance in the reflection area, the second voltage level having a voltage ratio in relation to the first voltage level; and adjusting the voltage ratio so that a ratio of the reflectance to the transmittance is achievable within a predetermined range, wherein the step of adjusting the voltage ratio comprising disposing a voltage divider in each of said pixels for adjusting the voltage ratio.

2. The method of claim 1, wherein the liquid crystal display panel is a normally-black display panel, and wherein the voltage divider is operatively connected to the reflective electrode for adjusting the second voltage level so that the voltage ratio is smaller than 1.

3. The method of claim 1, wherein the liquid crystal display panel is a normally-white display panel, and wherein the voltage divider is operatively connected to the transmissive electrode for adjusting the first voltage level so that the voltage ratio is greater than 1.

4. The method of claim 1, wherein the voltage divider is made of poly-silicon disposed in the reflection area.

5. A single-gap transflective liquid crystal display panel having a plurality of pixels, at least some of the pixels having a transmission area and a reflection area, said display panel comprising:

a transmissive electrode disposed in the transmission area in each of said pixels, the transmissive electrode operatively connected to a first voltage level to achieve a transmittance in the transmission area;

a reflective electrode disposed in the reflection area in each of said pixels, the reflective electrode operatively connected to a second voltage level to achieve a reflectance in the reflection area, the second voltage level having a voltage ratio in relation to the first voltage level; and a voltage divider disposed in each of said pixels for adjusting the voltage ratio such that a ratio of the reflectance to the transmittance is achievable within a predetermined range.

6. The display panel of claim 5, wherein the liquid crystal display panel is a normally-black display panel, and wherein the voltage divider is operatively connected to the reflective electrode for adjusting the second voltage level so that the voltage ratio is smaller than 1.

7. The display panel of claim 6, wherein the voltage divider comprises at least two resistor segments made of poly-silicon, and the reflective electrode is operatively connected to the voltage divider between the resistor segments, said display panel further comprising a storage capacitor in each of said pixels, operatively connected to the voltage divider between the resistor segments.

8. The display panel of claim 7, further comprising
a further storage capacitor operatively connected to the transmissive electrode.

9. The display panel of claim 7, wherein each of said pixels is associated with a data line and a gate line, and wherein the resistor segments comprise a first resistor segment and a second resistor segment, said display panel further comprising:
a first switching element controllable by the gate line, the first switching element operatively connected between the data line and the transmissive electrode;
a second switching element controllable by the gate line, the second switching element operatively connected between the data line and first resistor segment; and
a third switching element controllable by the gate line, the third switching element operatively connected between the second resistor segment and a common line of the display panel.

10. The display panel of claim 7, further comprising
a further reflective electrode in each of said pixels electrically separated from the reflective electrode, wherein the further reflective electrode is operatively connected to the transmissive electrode.

11. The display panel of claim 5, wherein the liquid crystal display panel is a normally-white display panel, and wherein the voltage divider is operatively connected to the transmissive electrode for adjusting the first voltage level so that the voltage ratio is greater than 1.

12. The display panel of claim 11, wherein the voltage divider comprises at least two resistor segments made of poly-silicon, and the transmissive electrode is operatively connected to the voltage divider between the resistor segments, said display panel further comprising a storage capacitor in each of said pixels, operatively connected to the voltage divider between the resistor segments.

13. The display panel of claim 12, further comprising
a further storage capacitor operatively connected to the reflective electrode.

14. The display panel of claim 12, wherein each of said pixels is associated with a data line and a gate line, and wherein the resistor segments comprise a first resistor segment and a second resistor segment, said display panel further comprising:
a first switching element controllable by the gate line, the first switching element operatively connected between the data line and the reflective electrode;
a second switching element controllable by the gate line, the second switching element operatively connected between the data line and first resistor segment; and
a third switching element controllable by the gate line, the third switching element operatively connected between the second resistor segment and a common line of the display panel.

15. The display panel of claim 5, wherein the voltage divider comprises at least two resistor segments.

16. The display panel of claim 5, wherein the resistor segments are made of poly-silicon disposed substantially in the reflection area.

* * * * *